US009009235B2

(12) United States Patent
Johnson, III et al.

(10) Patent No.: US 9,009,235 B2
(45) Date of Patent: Apr. 14, 2015

(54) ORDERED MESSAGE PROCESSING

(75) Inventors: William Kimble Johnson, III, Waltham, MA (US); Martin Anthony Serrano, Andover, MA (US)

(73) Assignee: Attivio, Inc., Newton, MA (US)

( * ) Notice: Subject to any disclaimer, the term of this patent is extended or adjusted under 35 U.S.C. 154(b) by 703 days.

(21) Appl. No.: 12/456,517

(22) Filed: Jun. 17, 2009

(65) Prior Publication Data

US 2010/0005147 A1 Jan. 7, 2010

Related U.S. Application Data

(60) Provisional application No. 61/073,164, filed on Jun. 17, 2008.

(51) Int. Cl.
| | |
|---|---|
| *G06F 15/16* | (2006.01) |
| *G06F 17/30* | (2006.01) |
| *G06F 9/54* | (2006.01) |
| *H04L 12/58* | (2006.01) |
| *H04L 29/08* | (2006.01) |
| *H04L 12/801* | (2013.01) |

(52) U.S. Cl.
CPC ............ *G06F 9/546* (2013.01); *G06F 17/3002* (2013.01); *H04L 12/58* (2013.01); *H04L 67/32* (2013.01); *H04L 47/10* (2013.01)

(58) Field of Classification Search
USPC ......................................................... 709/206
See application file for complete search history.

(56) References Cited

U.S. PATENT DOCUMENTS

| 5,588,117 | A | * | 12/1996 | Karp et al. ..................... 709/232 |
| 6,341,302 | B1 | | 1/2002 | Celis |
| 6,578,159 | B1 | * | 6/2003 | Kitagawa et al. ............... 714/15 |
| 7,434,225 | B2 | | 10/2008 | Groetzner et al. |

(Continued)

FOREIGN PATENT DOCUMENTS

| JP | 6-318158 A | 11/1994 |
| JP | 7-319787 A | 12/1995 |

(Continued)

OTHER PUBLICATIONS

Notification of Transmittal of the International Search Report and the Written Opinion of the International Searching Authority, or the Declaration, for International Application No. PCT/US2009/003626, mailed on Nov. 5, 2009.

(Continued)

*Primary Examiner* — Hamza Algibhah
*Assistant Examiner* — Natisha Cox

(57) ABSTRACT

Messages are processed to guarantee proper work scheduling and allow for cyclic and conditional processing. A processing node requiring ordered processing of messages is configured to operate within a plurality of successive processing nodes not requiring ordering processing of messages. Nodes upstream of the ordered node (i) monitor skew between the messages being processed and messages that are ordered after the messages still being processed and that have been forwarded downstream of the node and (ii) pause processing upon reaching skew limits. The nodes upstream of the ordered node limit output of messages to be within a delta of other messages as defined by message IDs. In addition, messages removed from a flow path are replaced by Null messages for ordered processing. Child messages are encoded to incorporate parent IDs preserving ordering systems.

39 Claims, 12 Drawing Sheets

(56) References Cited

U.S. PATENT DOCUMENTS

| | | | |
|---|---|---|---|
| 7,600,131 B1 * | 10/2009 | Krishna et al. | 713/192 |
| 7,761,514 B2 | 7/2010 | Popescu et al. | |
| 7,836,143 B2 | 11/2010 | Blocksome et al. | |
| 7,856,415 B2 | 12/2010 | Gatti | |
| 8,064,446 B2 | 11/2011 | Ramakrishnan et al. | |
| 8,081,628 B2 | 12/2011 | Wu et al. | |
| 8,194,690 B1 | 6/2012 | Steele et al. | |
| 8,271,996 B1 | 9/2012 | Gould et al. | |
| 8,295,203 B2 | 10/2012 | Ramakrishnan et al. | |
| 8,316,443 B2 | 11/2012 | Rits et al. | |
| 8,495,656 B2 | 7/2013 | Johnson, III et al. | |
| 8,649,377 B2 | 2/2014 | Ramakrishnan et al. | |
| 2002/0111986 A1 | 8/2002 | Wolfson | |
| 2002/0128919 A1 * | 9/2002 | Rime et al. | 705/26 |
| 2002/0194327 A1 | 12/2002 | DeGilio et al. | |
| 2003/0110230 A1 * | 6/2003 | Holdsworth et al. | 709/207 |
| 2003/0126294 A1 * | 7/2003 | Thorsteinson et al. | 709/247 |
| 2003/0158883 A1 * | 8/2003 | Drudis et al. | 709/102 |
| 2003/0223466 A1 * | 12/2003 | Noronha et al. | 370/537 |
| 2004/0120301 A1 | 6/2004 | Kitchin | |
| 2005/0038824 A1 * | 2/2005 | Kenntner et al. | 707/200 |
| 2005/0138632 A1 | 6/2005 | Groetzner et al. | |
| 2006/0015811 A1 * | 1/2006 | Tanaka et al. | 715/531 |
| 2006/0269063 A1 * | 11/2006 | Hauge et al. | 380/262 |
| 2007/0118601 A1 * | 5/2007 | Pacheco | 709/206 |
| 2007/0124398 A1 * | 5/2007 | Parkinson et al. | 709/206 |
| 2007/0143442 A1 | 6/2007 | Zhang et al. | |
| 2008/0259960 A1 * | 10/2008 | Favor et al. | 370/476 |
| 2008/0289039 A1 | 11/2008 | Rits et al. | |
| 2009/0164548 A1 * | 6/2009 | Hayer et al. | 709/201 |
| 2009/0208009 A1 * | 8/2009 | Hauge et al. | 380/239 |
| 2012/0096475 A1 | 4/2012 | Johnson, III et al. | |
| 2013/0046442 A1 | 2/2013 | Hayama et al. | |

FOREIGN PATENT DOCUMENTS

| | | |
|---|---|---|
| JP | 9-83541 A | 3/1997 |
| JP | 2000-163372 A | 6/2000 |
| JP | 2002-314566 A | 10/2002 |
| JP | 2002-314606 A | 10/2002 |
| JP | 2003-283539 | 10/2003 |
| JP | 2010-524333 A | 7/2010 |
| WO | 2009/154752 A1 | 12/2009 |
| WO | 2010/093288 A1 | 8/2010 |
| WO | 2012/051366 A2 | 4/2012 |
| WO | 2012/051366 A3 | 8/2012 |

OTHER PUBLICATIONS

Non Final Office Action received for U. S. Appl. No. 12/905,211, mailed on Oct. 3, 2012, 8 pages.

Notice of Allowance Received received for U. S. Appl. No. 12/905,211, mailed on Mar. 21, 2013, 9 pages.

International Preliminary Report on Patentability received for PCT Patent Application No. PCT/US2011/056054, mailed on Apr. 25, 2013, 5 pages.

International Search Report and Written Opinion received for PCT Patent Application No. PCT/US2011/056054, mailed on Jun. 18, 2012, 7 pages.

Office Action received for Japanese Patent Application No. 2013-533990, mailed on Sep. 5, 2013, 2 pages of Office Action and 2 pages of English translation.

First Office Action in Japanese Patent Application No. 2011-514608, mailed on Oct. 8, 2013, with partial English translation.

Second Office Action in Japanese Patent Application No. 2011-514608, mailed on Jul. 8, 2014, with partial English translation.

Takashi Sonoda, "Evaluation of Link Aggregation by Duplication and Unification of Packets for TCP Traffic", IEICE Technical Report, Japan, The Institute of Electronics, Information and Communication Engineers, Feb. 27, 2004, vol. 103, No. 692, pp. 171-174, with English Abstract.

Non Final Office Action received for U.S. Appl. No. 13/943,624, mailed on Mar. 27, 2014.

Notice of Allowability Received received for U.S. Appl. No. 13/943,624, mailed on Jul. 8, 2014.

* cited by examiner

ORDERED MESSAGE PROCESSING

RELATED APPLICATION(S)

This application claims the benefit of U.S. Provisional Application No. 61/073,164, entitled "Ordered Message Processing," filed on Jun. 17, 2008. The entire teachings of the above application are incorporated herein by reference.

BACKGROUND OF THE INVENTION

A common approach for modeling high-throughput data flow processing is to represent the data flow as a directed graph, in which nodes represent computation resources and edges represent data transmission paths among the nodes. In such cases, nodes can be decoupled from each other by using asynchronous data transmission. This decoupling allows each computation node to execute as efficiently as possible since it does not have to wait for downstream nodes to complete processing before it can begin processing the next message. In some cases, multiple computation nodes can be executed in parallel and together act as "single" computation node, thus processing many units of work simultaneously.

A Staged Event Driven Architecture (SEDA) enhances this approach by inserting bounded queues between computation nodes. When a node A attempts to transfer work to another node B, if the queue between the nodes A and B is full, then A blocks until B has consumed some work from the queue. This blocking of A prevents A from consuming new work which in turn causes its input queue to get full, blocking any predecessors. One example of a process that utilizes such a technique is search engine document ingestion, in which multiple forms of documents (emails, PDFs, multimedia, blog postings, etc.) all need to be processed and indexed by a search engine for subsequent retrieval.

SUMMARY OF THE INVENTION

These techniques provide an efficient way to throttle work in a dataflow processing system. However, it is often desirable for particular computation nodes to guarantee the order in which they process messages. For example, a commit message for a transaction cannot be processed before the work that is to be committed. Parallel asynchronous dataflow processing with SEDA, while extremely efficient in throttling work in a high-throughput low-latency way, has several attributes which can perturb message order.

Plural methods, systems, and corresponding articles of manufacture, having computer readable program portions, relate to processing messages. A plurality of successive processing nodes may be enabled to include a node that requires ordered data.

One or more sources of documents may supply input into the system. Sources may include file system repositories, email servers, physical media (e.g., CD-ROM, DVDs), text translated from speech recognition systems, and databases. The documents may be inserted into successive messages for processing by the system.

Message IDs may be applied to successive messages. Processing of messages may generate child messages. The child messages may be assigned message IDs and the child message IDs may be encoded to incorporate associated parent IDs. The parent IDs may be annotated to indicate the number of related child messages.

In some cases, a string of messages may contain related documents. Messages containing related messages may all need to be committed to permanent storage contemporaneously and in the order in which they were sent. As such, groups of messages containing related documents may be identified according to message IDs.

Advantageously, a system-generated message ID number may be used to process messages according to the ID number, the characteristics of each node, and the results of processes executed at the nodes. Nodes that require ordered processing have an input queue that delivers messages to the node based on the message ID. Such a node can operate in fully ordered mode or operate on "groups" of messages separated by boundary messages. In some cases the system-generated message ID numbers are unique throughout the system.

A node upstream of the ordered node may be enabled to (i) monitor skew between the messages being processed and messages that are ordered after the messages still being processed and that have been forwarded downstream of the node and (ii) pause processing upon reaching skew limits.

Advantageously, in some applications, the ability for arbitrary nodes to process messages in order is preserved, while maintaining the ability to use an asynchronous, highly-parallel arbitrary directed graph processing model. Characteristics of individual nodes and the messages being processed can be used to direct message flow such that any ordering constraints are met and recursive processing is permitted without impacting overall system performance. For example, some computation nodes do not require ordered message processing. Likewise, some message types which do not need to be processed in any particular order (even those that may be processed by nodes which require ordered message processing). Some message types, such as extracting fields from two different XML documents can be performed in either order or in parallel or may represent boundaries between groups of messages (e.g., "shutdown," "checkpoint," and "commit."). Further, some nodes do not require ordered message processing so long as all the messages in one group are processed before the next boundary message.

The node upstream of the ordered node may monitor skew in messages as a function of message IDs associated with the messages.

Each processing node may also be enabled to process messages using asynchronous data transmission. Further, the processing nodes may be enabled to process messages while being decoupled from each other. In addition, each processing node may be enabled to process multiple messages simultaneously using multiple threads of each processing node. Processing nodes may also be enabled to recognize and process Null messages. Input queues may be enabled to precede each processing node.

Messages may be processed at different rates depending on content, allowing for output of messages out of order. The output of messages may be limited to be within a delta of other messages as defined by the message IDs (skew). Ordered message processing may be enabled downstream from the output of messages out of order.

Limiting output of messages may include pausing processing of messages outside the delta of other messages as defined by the message IDs.

A first node may be enabled to remove a message from a series of ordered messages in a flow path and insert a Null message for the removed message. An ordered processing node may process messages in order in the flow path and recognize the Null message in the flow path in place of the removed message.

Advantageously, in some applications, Null messages having a matching message ID are used to maintain message ordering. For example, if the processing of a document at a particular node results in a conditional result, (i.e., the message may be forwarded on to two or more nodes or the message is split into sub-messages which are in turn distributed to a subset of nodes), a branching node is used. In cases in which a branching node will forward a message to only one (or less than all) of its downstream nodes, Null messages with matching message IDs are sent to those nodes not receiving the message, and each message is noted as "one of n" where n represents the number of downstream nodes. Similarly, if a message is deleted, a Null message may be placed in the system to maintain the order of other messages being processed. When a split path of processing is rejoined, a join computation node is inserted that recombines sub-messages and discards the Null messages.

Messages may be removed in response to an unrecoverable processing error of the message. Messages may also be removed in response to branching of the flow path. Further, the first node may delete a message from a flow path. The null messages may then be used in place of the removed messages to facilitate ordered processing.

Messages in flow paths that have branched into multiple flow paths may be recombined to re-form the original flow path. In order to facilitate the reformation of the original flow path and nested branching of nodes, Null messages may indicate a destination node and a joining node may recombine messages to re-form the flow path and delete Null messages having the joining node as the destination node.

A document type node may (i) split messages into constituent message nodes based on document types included with the message, (ii) forward the message to downstream processing nodes, and (iii) create Null messages for forwarding to downstream processing nodes for which no message node was identified;

A plurality of document processing nodes, wherein each document processing node may be configured to process message nodes having a particular document type.

A joiner node may receive the constituent message nodes processed at the document processing nodes and delete Null messages.

Other aspects and advantages of the methods, systems, and corresponding articles of manufacture will become apparent from the following drawings, detailed description, and claims, all of which illustrate the principles of the methods, systems, and corresponding articles of manufacture, by way of example only.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

The processing and ingestion of documents and structured data into an indexed, searchable data store, requires numerous steps, some of which must be executed in a particular order and others that may be processed in parallel. In order to facilitate document processing and ingestion, documents are held within messages having unique message IDs. As used herein, the term document may refer to unstructured data such as .pdf files, video, audio, email, or to structured data such as XML files, .csv files, or data received from database sources. Further, certain documents (e.g., emails having multiple attachments) introduce the possibility of multiple processing threads, differing processing times, and recursive processing. These complications can cause discontinuities in the ordered processing of messages and message components, as truly asynchronous processing may process different elements of a message at different times, resulting in "out of order" processing as depicted in FIGS. 1A-1C.

Figure 1A:
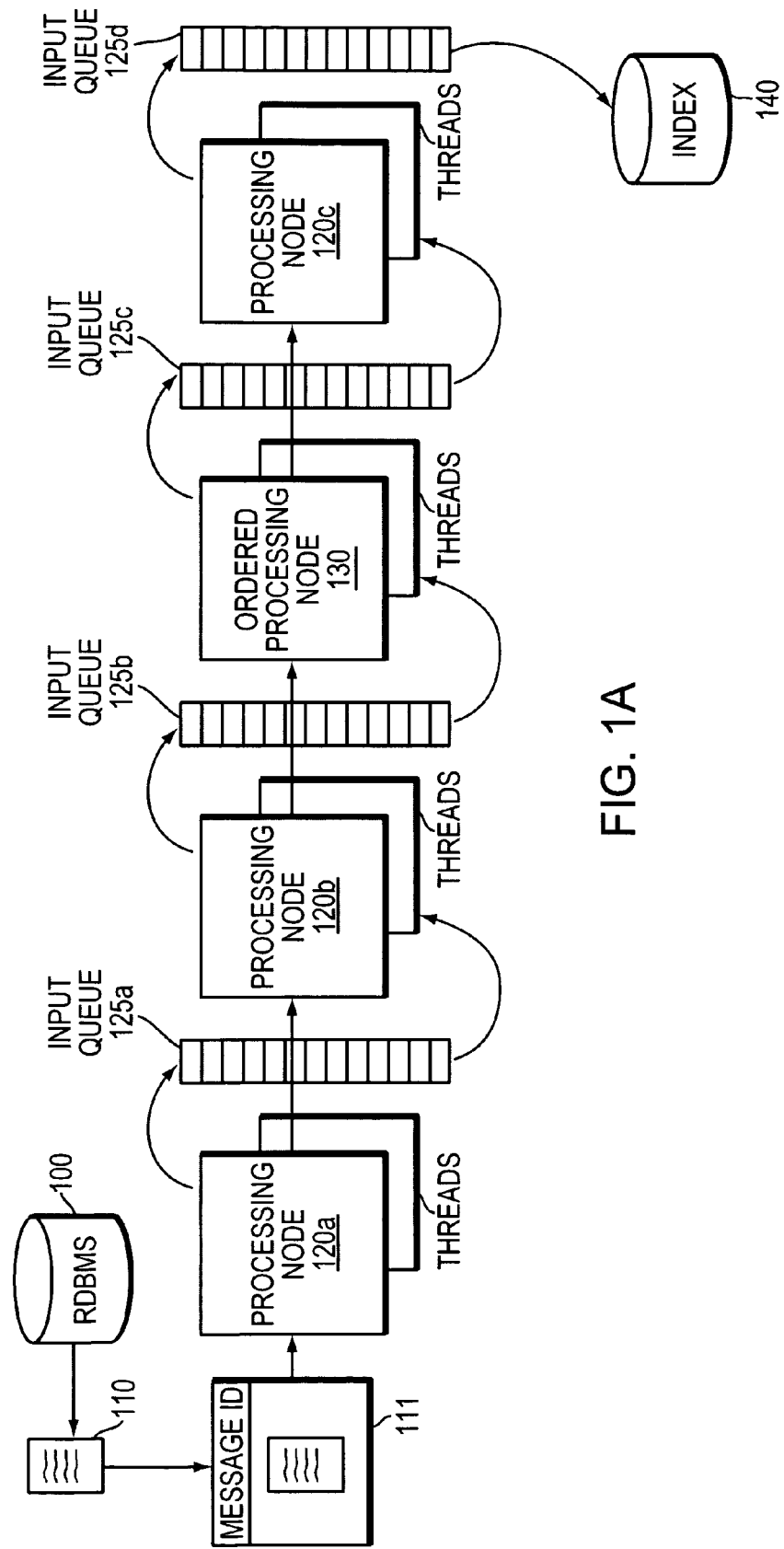
FIG. 1A illustrates a system employing an asynchronous, highly-parallel arbitrary directed graph processing model.

FIG. 1A illustrates a system employing an asynchronous, high-parallel arbitrary directed graph processing model. One or more documents 110 supply input to the system via a document store 100, such as a record-based database management system (RDBMS). Documents 100 are inserted into messages 111, each having unique message IDs. Processing Nodes 120a-c receive the messages 111 and process the documents within them accordingly. Each processing node 120a-c may comprise multiple threads allowing the processing of many messages 111 simultaneously. Input queues 125a-d precede each processing node. Input queues 125a-d allow each node to process messages without over committing resources, blocking preceding nodes as the queues get full. As such, the input queues 125a-d bound load on the overall system. After each message is processed, it may, for example, be ingested into an indexed, searchable data store 140. Each processing node 120a-c does not require the ordered processing of messages 111. However, ordered processing node 130 does require the processing of messages 111 in an ordered fashion. As a result, ordered processing node 130 must stop processing and wait to receive a message that completes a sequential set of messages. A sequential set of messages may be a set of messages containing related documents. In such a scenario, ordered processing node 130 will never receive the message that completes the sequential set of messages and the system will fail. One alternative is to allow the queue 125b to be unbounded, giving ordered processing node 130 access to all messages 111. This alternative however defeats the load bounding properties the queues are supposed to deliver.

Figure 1B:
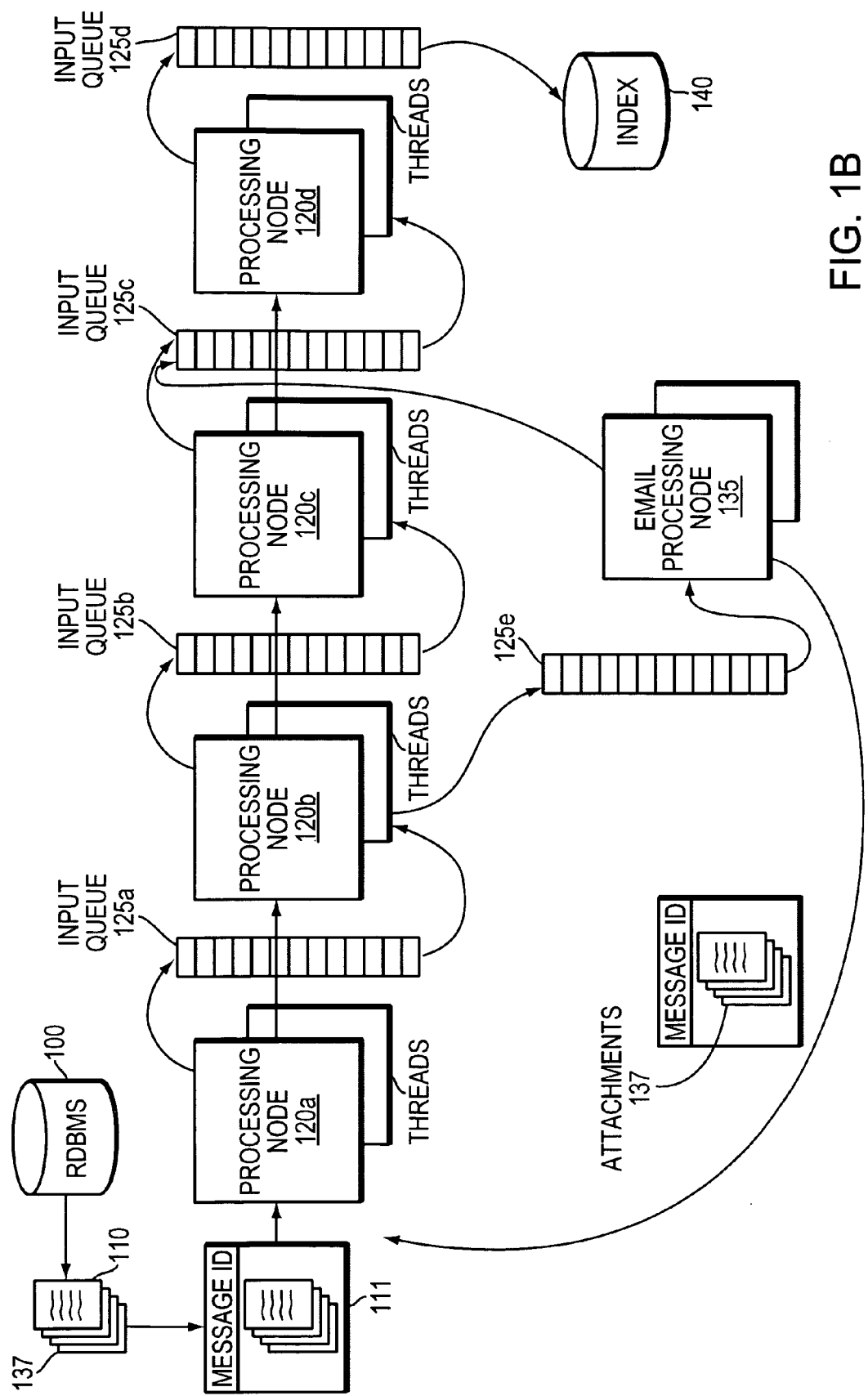
FIG. 1B illustrates another system having recursive message processing and an asynchronous, highly-parallel arbitrary directed graph processing model.

FIG. 1B illustrates another system having recursive message processing using an asynchronous, highly-parallel arbitrary directed graph processing model. As illustrated, if document 110 is an email containing attachments 137 (.doc files, .pdf files, images, video, .zip files, etc.), there exists a potential for portions of the message to be processed and stored without other portions, resulting in an incomplete or inaccurate database. This would occur if the attachments require additional processing (unzipping, scanning, indexing, etc.), and the resources for providing such processing are busy. For example, processing node 120b will pass message 111 containing document 110, an email message, having attachments 137 to email processing node 135. Email processing node 135 will extract attachments 137 from the email and pass them to processing node 120a. Contemporaneously, email processing node 135 will pass the text of the document 110 to input queue 125c. Therefore, the email message may be processed well before its corresponding attachments. Alternatively in some situations, the attachments 137 could be processed by nodes 120a-d before the text of document 110 arrives at node 120c, resulting in attachments 137 arriving at the index before the text of document 110.

Figure 1C:
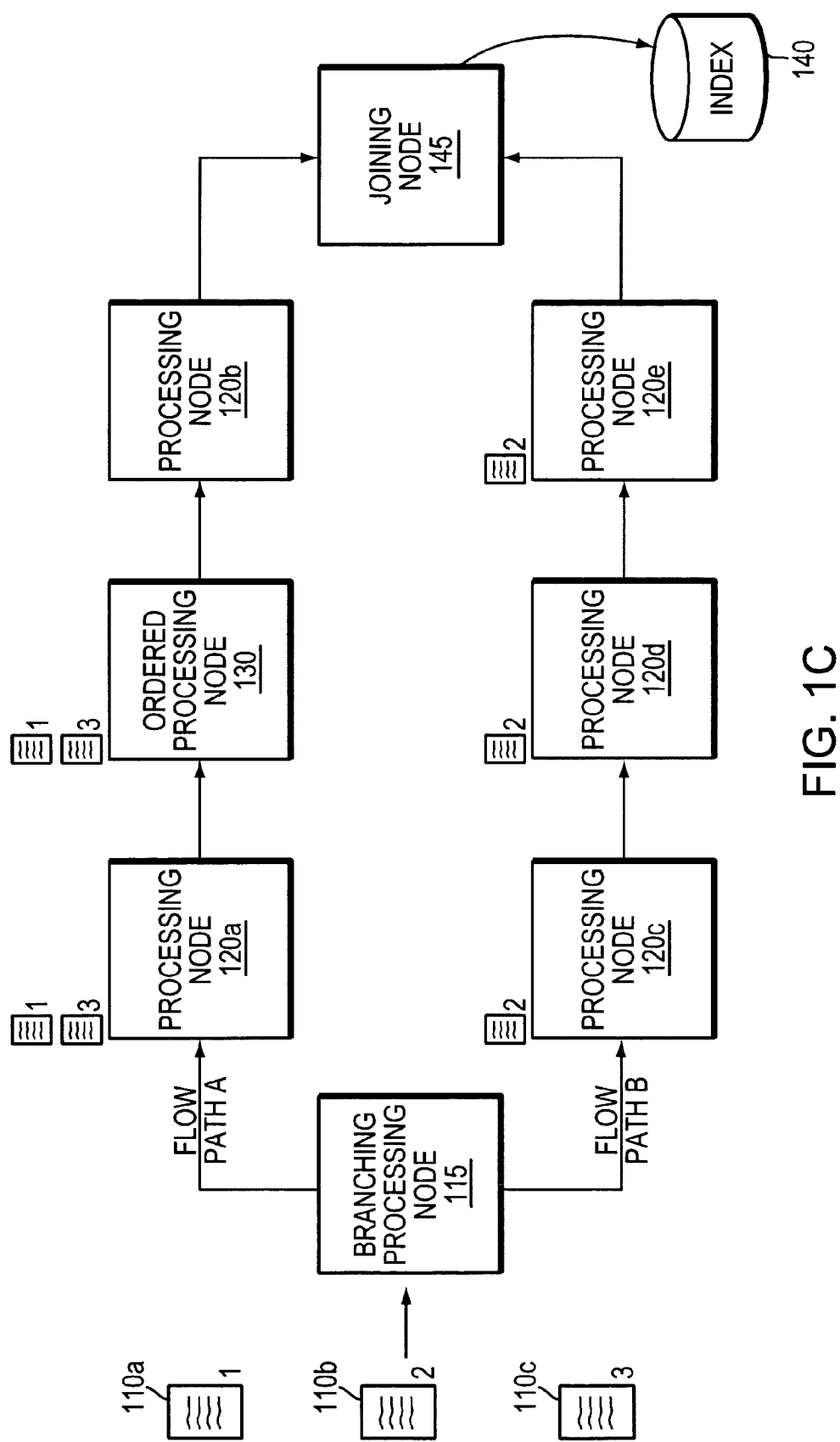
FIG. 1C illustrates another system including a branch in an asynchronous, highly-parallel arbitrary directed graph processing model.

FIG. 1C illustrates a system including a branch in an asynchronous, highly-parallel arbitrary directed graph processing model. For example, assume branching node 115 receives a set of sequential documents 110a-c. Upon receiving the documents branching node 115 diverts the first document 110a and the third document 110c to follow flow path A based on processing conditions. Similarly, branching node 115 diverts the second document 110b to flow path B. If subsequent processing nodes on each flow path do not require ordered processing, the system will continue to run smoothly and joining node 145 will receive all the documents, recombine them, and pass them to the index 140.

In this example, ordered node 130 in flow path A requires ordered processing. Ordered node 130 will receive the first document 110a and the third document 110c, and halt processing until it receives the second document 110b. However, ordered node 130 will never receive document 110b because it has been diverted to flow path B, and thus cause the system to err.

In general, techniques and systems are provided that preserve required message ordering while maintaining the ability to use an asynchronous, highly-parallel arbitrary directed graph processing model. Characteristics of individual nodes and the messages being processed can be used to direct message flow such that ordering constraints are met and recursive processing is permitted without impacting overall system performance. For example, some computation nodes may not require ordered message processing, and some message types need not be processed in any particular order.

When a message is injected into the system, it is marked with an increasing message ID, indicating the order in which the messages are to be processed based on the ordering characteristics of the processing nodes. This message ID may be any data which allows the reconstruction of the original order of insertion. Computation nodes requiring ordered message processing are annotated as such and are preceded by a modified input queue that delivers messages in order based on the message ID number.

A node upstream from the ordered processing node may be configured to monitor skew thresholds for every message ID. The upstream node may then adjust processing of messages upon reaching the skew threshold such that a downstream ordered processing node receives the message ID corresponding to a set of sequential documents without becoming overloaded with documents in its input queue. Nodes which do not require ordered message processing can run in parallel with other nodes without consideration of the message ID number. Some message types may signify boundaries between "groups" of messages that represent a collection of sub-messages (e.g., multiple message attachments). When a boundary message arrives at a processing node (a message indicating the start or end of a grouped set of messages), delivery of new messages (either singular messages or messages belonging to a next group) are halted until the boundary message is fully processed. Some nodes may not require ordered message processing so long as all the messages in one group are processed before the next boundary message.

As illustrated in FIG. 1A, an ordered processing node 130 requires the processing of messages in an ordered fashion. Processing nodes 120a-b that do not require ordered processing generally will process messages in any order. As a result, ordered processing node 130 will have to halt processing until it receives a sequential set of messages. However, ordered processing node 130 may not receive a message that completes a sequential set of messages before it has become overloaded with messages. As such, processing nodes 120a-b may employ skew detection to prevent a downstream node requiring ordered processing from becoming overloaded with messages.

Figure 2:
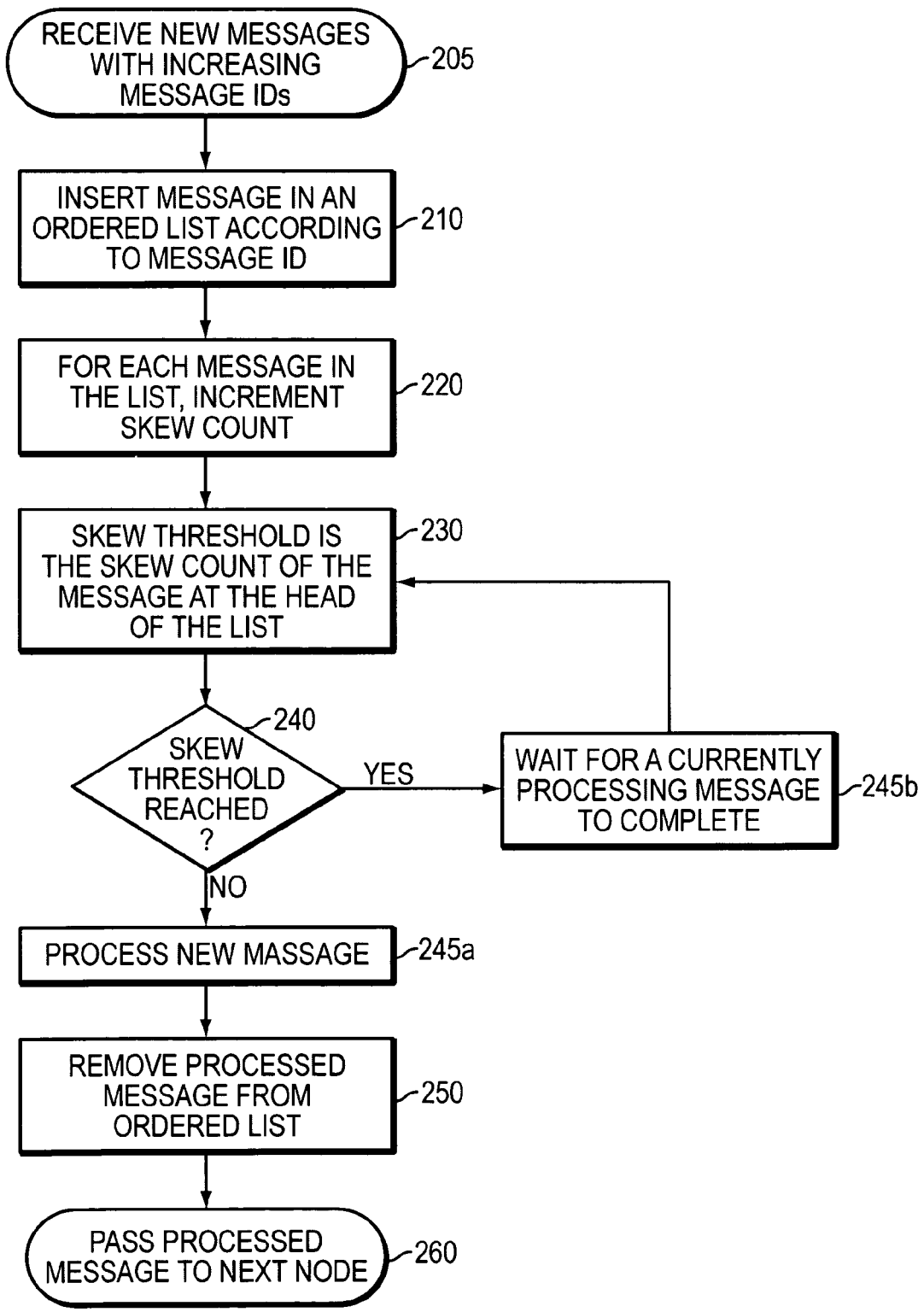
FIG. 2 is a flow diagram of a method employing skew detection in an asynchronous highly-parallel arbitrary directed graph processing model.

FIG. 2 is a flow diagram of a method 200 employing skew detection in an asynchronous highly-parallel arbitrary directed graph processing model. This method provides a precise measure of skew regardless of the message ID scheme in use. In particular it does not depend on message ID data being a number. Other methods may be used to calculate or estimate skew for specific message ID schemes. At step 205, processing node 120a from FIG. 1, receives messages with increasing message IDs. Message IDs indicate the order in which the messages are to be processed based on the ordering characteristics of the processing nodes. Although, processing node 120a does not require ordered processing, it must implement skew detection in order to facilitate ordered processing at ordered processing node 130 from FIG. 1. Next, at step 210, received messages are inserted into an ordered list according to message ID.

At step 220, the skew count is incremented for each message on the ordered list. A skew count is calculated as the number of messages being processed in processing node 120a from the message ID to a message having the greatest message ID. In order to facilitate ordered message processing downstream from processing node 120a, processing node 120a only allows parallel processing of messages having a greater message ID than any other currently processing message up to a predetermined skew threshold.

For example, if a skew threshold is predetermined to be a count of 20 messages, and processing node is currently processing a message with a message ID of '1,' the processing node will not allow a message with a message ID of 21 to be processed in parallel. Therefore, at step 230, the current skew count is calculated by taking the skew count of the head of the ordered list. The message at the head of the list is the message with the lowest message ID that is currently being processed. At step 240, the node determines if the skew threshold has been reached. If not, at step 245a, the node processes messages, and at 250 removes processed messages from the ordered list. If a skew threshold has been reached, at 245b, the node pauses processing of messages until a message has completed processing at which point step 230 is used to calculate the current threshold. Although the method 200 is shown to transpire in a particular sequence, other sequences are possible, as well, in other embodiments.

When a branch occurs in the directed graph (e.g., multiple message components are sent to different processing nodes), a special Null message with a matching message ID is sent to all branches to which the message is not sent. Similarly, if a message is to be deleted by a node in the system (e.g., a determination is made that the message is empty, does not meet certain ingestion rules, or is a duplicate), it is replaced with a Null message with a message ID matching the initiating message. In addition, Null messages are used to replace messages lost where a node encounters an unrecoverable processing error. When a split path of processing is rejoined, a special join computation node combines all messages having the same message ID and drops associated Null Messages. Null messages allow an ordered processing node to use the null messages as a place holder for the removed messages, without interrupting ordered processing.

Figure 3A:
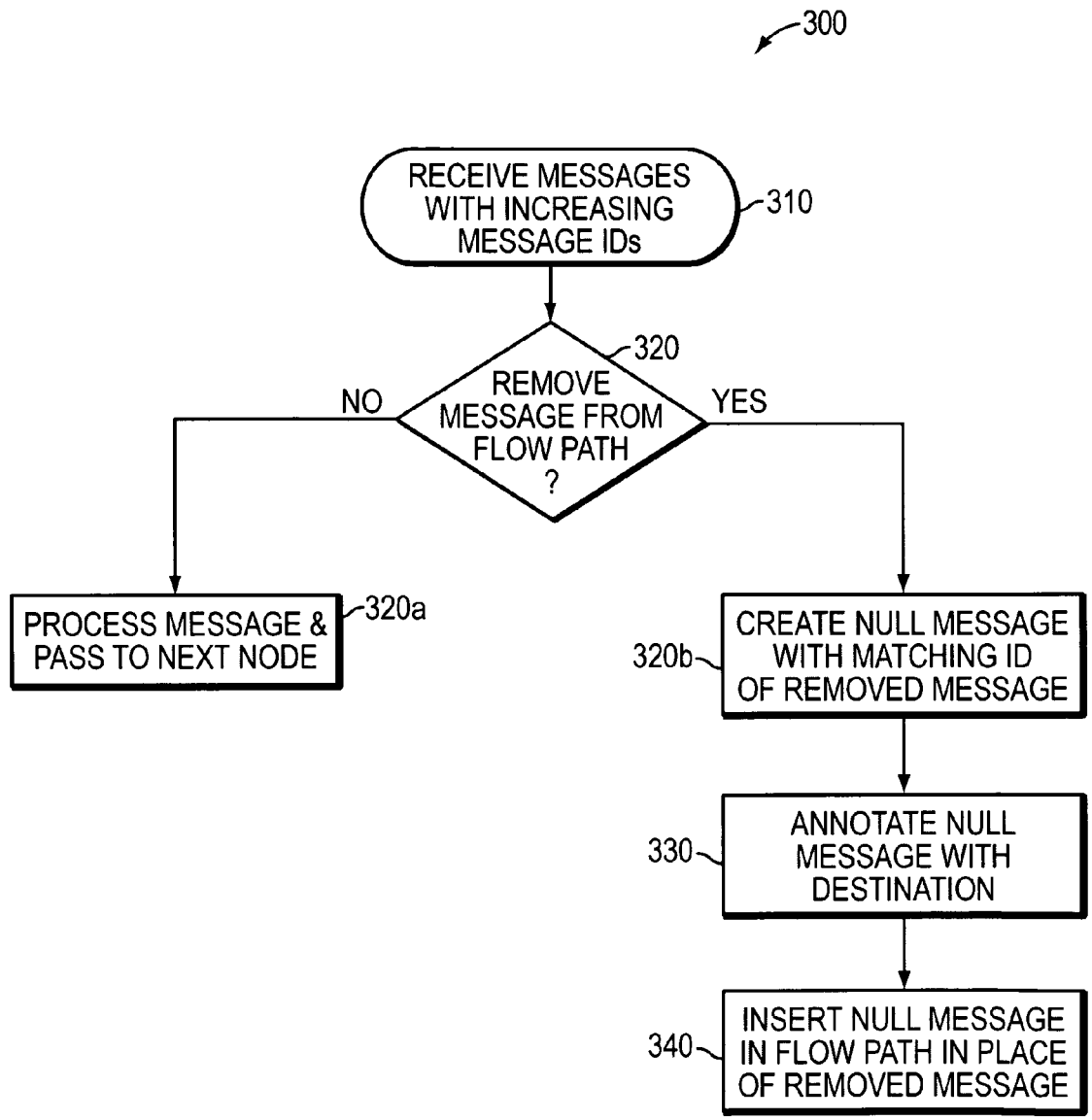
FIG. 3A is a flow diagram of a method employing the use of Null messages in an asynchronous highly-parallel arbitrary directed graph processing model.

FIG. 3A is a flow diagram of a method 300 employing the use of null messages in an asynchronous highly-parallel arbitrary directed graph processing model. At step 310, a processing node receives messages with increasing message IDs. At step 320, the node determines whether a message must be removed from a flow path in response to a condition. The condition may include (i) branching a message to another flow path, (ii) deletion, or (iii) an irrecoverable processing error. If a message does not need to be removed, the method continues to step 320a, and the node processes the message and passes it to the next node.

However, if the node determines that a message must be removed, at 320b, a null message is created with a matching ID of the removed message. At 330, the null message is annotated with a destination node. Next, at 340, the node inserts the null message in a flow path in place of the removed message. Although the method 300 is shown to transpire in a particular sequence, other sequences are possible, as well, in other embodiments.

Figure 3B:
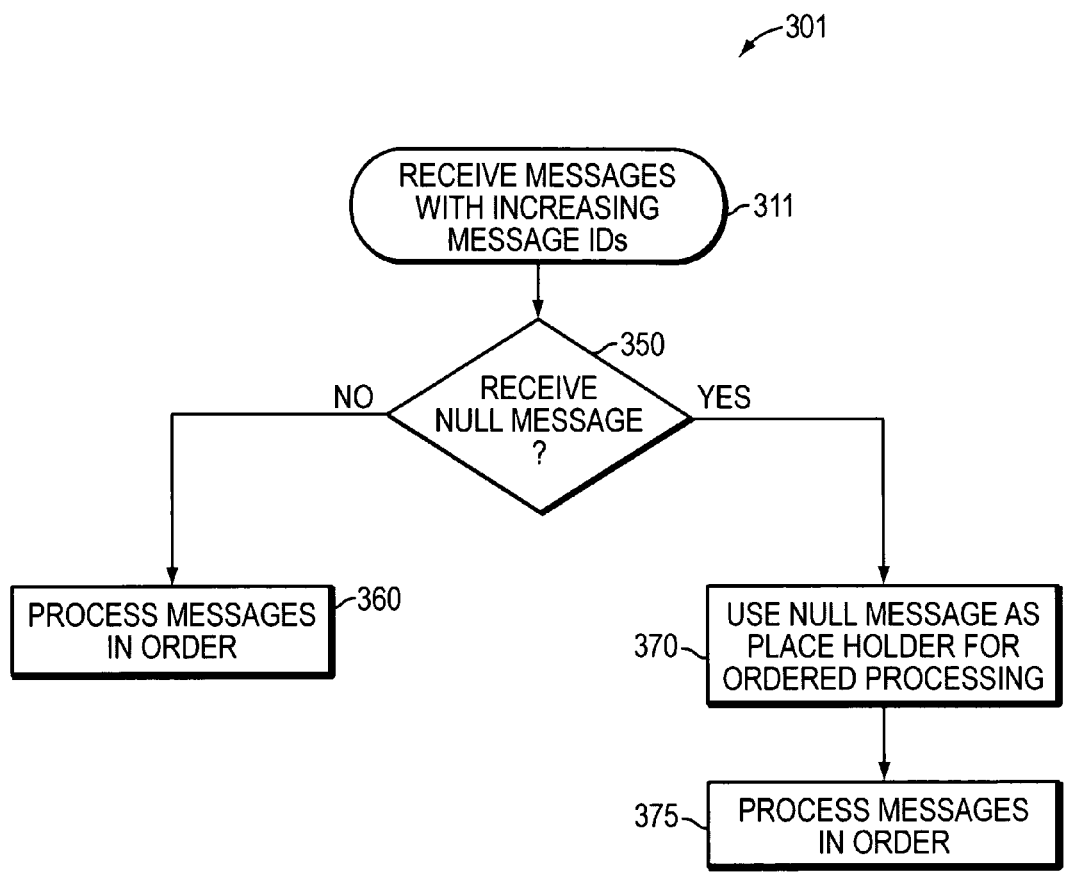
FIG. 3B is a flow diagram of a method employing the use of Null messages in an asynchronous highly-parallel arbitrary directed graph processing model comprising ordered processing.

FIG. 3B is flow diagram of a method 301 employing the use of null messages in an asynchronous highly-parallel arbitrary directed graph processing model comprising ordered processing. At step 311, an ordered processing node received messages with increasing message IDs. At step 350, it is determined whether the node has received a null message within a set of sequential messages. If so, at 370, the node will use the null message as a place holder, and at 375, process the messages in order. Otherwise, at 360, the ordered processing node will process the set of sequential messages in order. Although the method 301 is shown to transpire in a particular sequence, other sequences are possible, as well, in other embodiments.

Figure 3C:
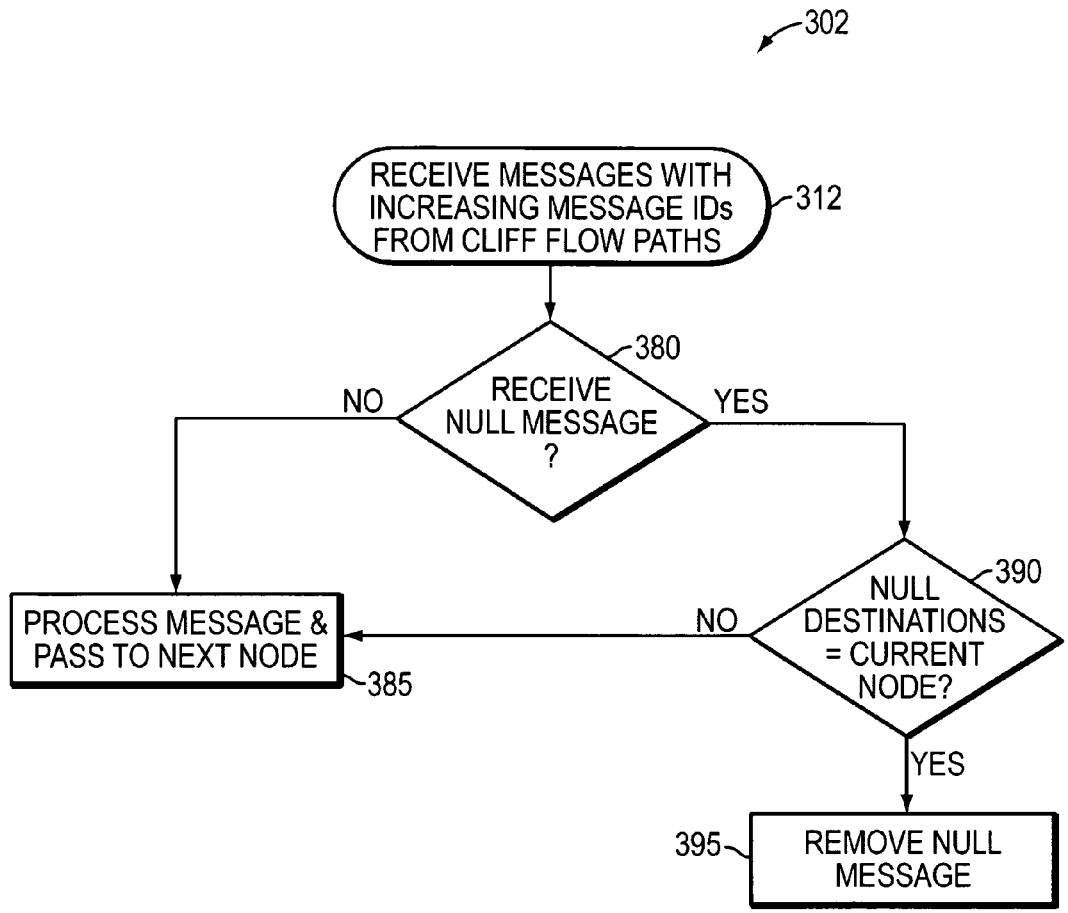
FIG. 3C is a flow diagram of a method employing the use of Null messages in an asynchronous highly-parallel arbitrary directed graph processing model to re-form a flow path.

FIG. 3C is a flow diagram of a method 302 employing the use of null messages in an asynchronous highly-parallel arbitrary directed graph processing model to re-form a flow path. At 312, a joining node receives messages with increasing message IDs from different flow paths. At 380, a determination is made as to whether the joining node has received a null message. If not, at 385, the joining node processes the messages and passes them to the next processing node. If so, at 390, a further determination is made as to whether the joining node is the destination node of the null message, and if so, the joining node will remove the null message. If not, the process continues at step 385. Although the method 302 is shown to transpire in a particular sequence, other sequences are possible, as well, in other embodiments. Some embodiments may not make use of the destination node annotation (the joining node assumes it is the destination), but these embodiments will not support nested branching of computations.

Referring to FIG. 1C, assume, at step 310, that a node that receives the messages is branching node 115. Branching node 115 has received 3 messages 110a-b with increasing message IDs '1,' '2,' '3.' In this example, branching node has diverted message IDs '1' (110a) and '3' (110c) to flow path A, and message ID '2' (110b) to flow path B, at step 320, due to processing conditions. Because flow path A includes ordered processing node 130, branching node creates a null message with a message ID of '2.' At 330, the branching node 115, annotates the null message with a destination as joining node 145. Next, at 340, branching node, inserts the null message with message ID '2' in flow path A in place of message 110b.

In this case, messages IDs '1,' '3,' and null message ID '2' are passed to processing node 120a, and the original message ID '2' is passed to processing node 120c. At 311, ordered processing node receives the messages. Next, at 350, the ordered processing node determines it has received a null message. Then, at 370, the ordered processing node uses the null message as a place holder in order to process messages in order and, at 375, the ordered processing node process the received messages in order.

Next, at 312, joining node receives messages from flow path A and flow path B. At 380, the joining node determines it has received a null message. The null message may be received well before original message ID '2.' Therefore, at 390, joining node determines whether the destination of the null message is the joining node. In this case, the destination of the null message is the joining node, because the original message ID '2' has the same destination. At, 395, because null message ID '2' was annotated with a destination of joining node, joining node knows to remove the null message. This annotation allows joining node to process the null message without having to wait to receive every message from each flow path.

Newly created messages, such as child messages associated with a parent message, may be assigned a message ID encoded to incorporate the message ID of the parent message. Further, the parent message ID is annotated to indicate the number of associated child messages. Thus, when a node requiring ordered processing receives a parent message, the node and preceding nodes are able to adjust processing, allowing the ordered processing of parent and child messages. Similarly, a joining node is able to recognize when all messages containing related documents have been received in order to re-form a flow path.

Figure 4:
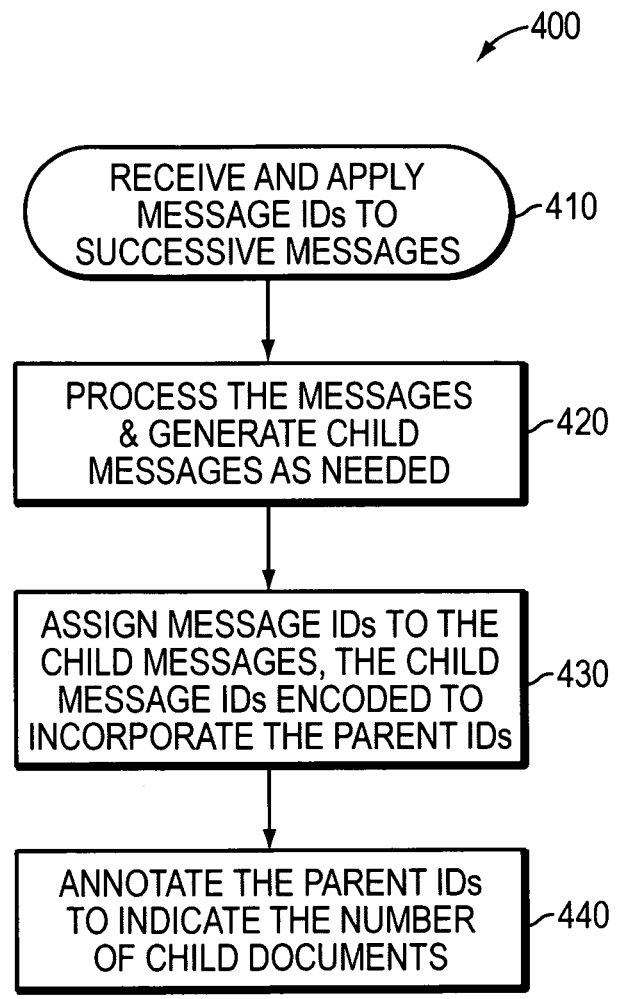
FIG. 4 is a flow diagram of a method employing the use of multi-part message IDs in an asynchronous highly-parallel arbitrary directed graph processing model.

FIG. 4 is a flow diagram of a method 400 employing the use of multi-part message IDs in an asynchronous highly-parallel arbitrary directed graph processing model. At step 410, the method receives and applies message IDs to successive message IDs. Next, at 420, the messages are processed, and child messages are generated as needed. For example, a message such as an email may contain multiple attachments, and child messages are generated for each attachment. At 430, the child messages are assigned message IDs that are encoded to incorporate the parent IDs. At 440, the parent IDs are annotated to indicate the number of child messages. This annotation allows a downstream node to know when all related messages have been received. Although the method 400 is shown to transpire in a particular sequence, other sequences are possible, as well, in other embodiments.

Referring to FIG. 1B, assume at step 410, a message 110 having a message ID of '1' is an email message containing multiple attachments 137 is received as well as successive messages having increasing message IDs. The messages are processed in the system. At 420, email processing node 135, processes the email message and generates child messages for each attachment 137. Because successive messages have followed message 110, for example a message with message ID '2,' email processing node cannot assign increasing message ID '2' to any of the attachments 137. As a result, each attachment 137 is inserted into a message that incorporates the parent's message ID. In this case, the parent ID is '1', therefore, if there are two attachments, the first attachment will be inserted into a message with a multi-part message ID of '1.1' and the second attachment inserted into a message with the ID '1.2' At 440, the parent ID is annotated as having 2 child documents. This encoding method allows the insertion of new messages without having to re-number each successive document received by the system.

Further assume that child document '1.1' has two children. At 420, the child messages are generated, and at 430 the child messages are assigned IDs of '1.1.1' and 1.1.2.' Child document '1.1' is then, at 440, annotated as having 2 children.

FIGS. 5A-5D provide alternative examples using a directed graph to represent multiple processing steps (nodes) within a document ingestion system. One or more sources of documents supply input into the system via a processing node 502. Sources may include file system repositories, email servers, physical media (e.g., CD-ROM, DVDs), text translated from speech recognition systems, database, etc. The processing node 502 manages the ingestion of documents into the processing steps, either from external sources or as additional documents are "discovered" during processing and routed back into the system. Documents are initially routed into a document type splitter 504. The splitter 504 determines which subsequent processing node (or nodes) to send the message. For example, the system may include an email node 506 for processing email text (which in some cases may include header information and/or routing information as well as the email text), a .zip processing node 508 for processing documents created using pkZIP or some other file archiving or compression program, a .doc processing node 510 for processing documents created using Microsoft Word (or other word processing programs such as GOOGLE DOCS, OpenOffice, etc.), and a .pdf processing node 512 for processing documents in portable document format. Other examples of processing nodes not shown include a .jpg processing node for processing images, an .mpeg node for processing movies, an .avi node for processing audio, nodes for processing various structured data formats, etc. In the example provided, there are four different processing nodes; however any number of nodes is possible and typically based on the number and types of documents available to the system. In some cases, multiple processing nodes performing the same function (e.g., three nodes dedicated to .jpg files) if a high number of documents of that particular type are encountered frequently and/or if the process is resource intensive.

In some instances, further analysis is needed to obtain a canonical representation of the most basic elements of the message. For example, an email may have one or more attachments, each of which requires different processing at different processing nodes. Furthermore, there may be instances in which, in order to maintain integrity of the document index, documents having more than one component should not be written to the index unless and until all of the components have been successfully processed. In other words, if the processing of certain attachments to an email fails, the text of the email (and other components or attachments that were successfully processed) should not be written to the index. Some implementations may allow for partial document indexing, whereas in others this constraint may be enforced without exception. In some cases, rules may be used to determine which "failures" are considered acceptable, and which are fatal. Multi-part messages IDs are used to associate parent messages, for example, messages containing emails, with child messages (e.g., email attachments). The parent messages are annotated to indicate the number of child messages that are generated.

In implementations in which multiple processing branches are used (as with the processing nodes 506, 508, 510 and 512), a branch joiner node 514 is provided as a common node to which each branch feeds messages as they are processed. The branch joiner 514 identifies those messages that include documents and/or text to be ingested into the index, and deletes null messages. Further, the branch joiner 514 uses the multi-part message IDs and parent annotation to identify the documents that need to be, contemporaneously, ingested into the index.

To facilitate ordered message processing, each processing node includes a message queue. Message queues are used to store multiple messages awaiting processing at a particular node and/or to reorder messages based on their message IDs as they arrive at a processing queue out of order.

Figure 5A:
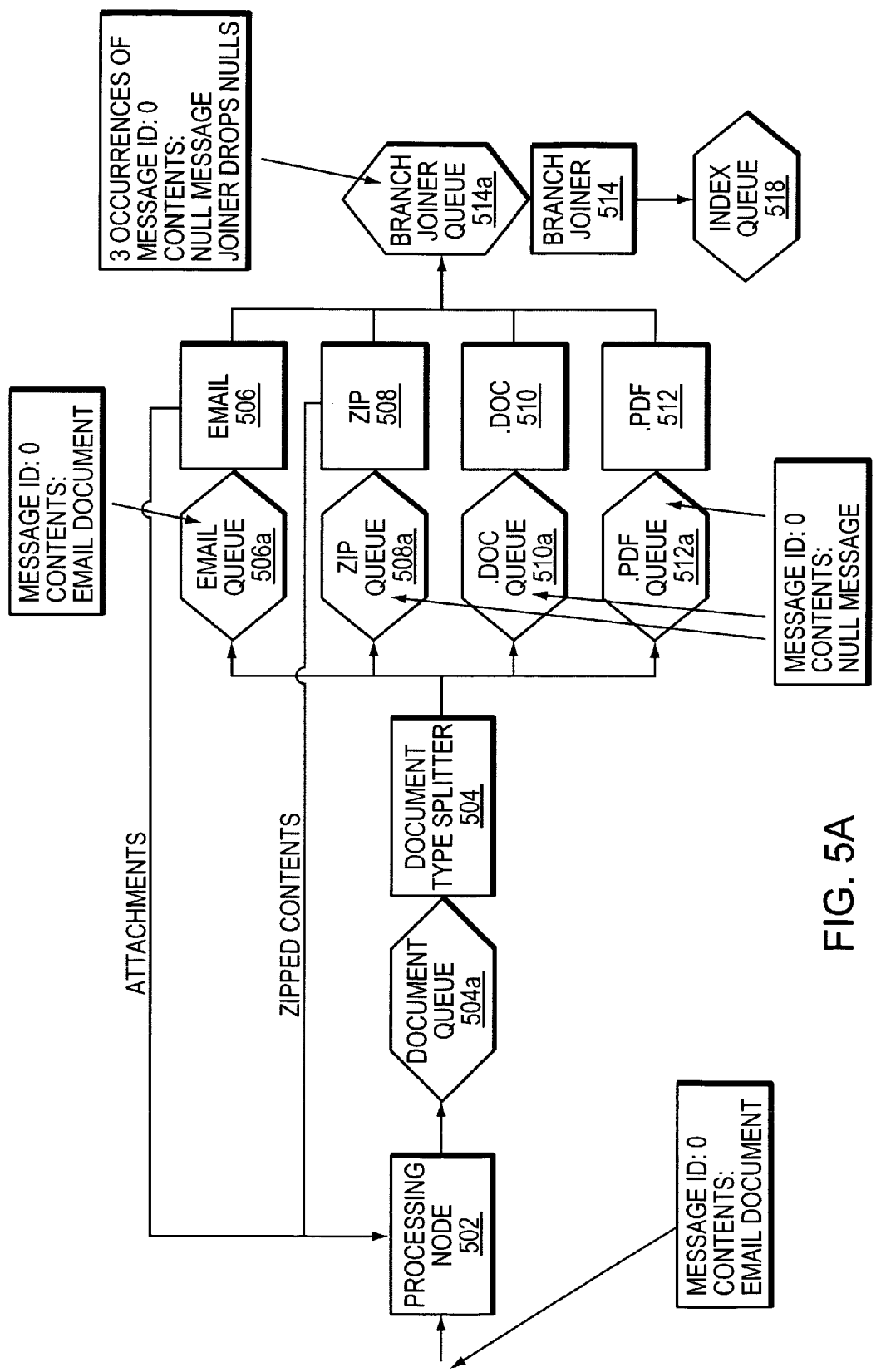
FIGS. 5A-5D provide alternative examples using a directed graph to represent multiple processing steps (nodes) within a document ingestion system.

FIG. 5A illustrates how a simple email message (e.g., an email having message text but no attachments) is processed according to one embodiment of the invention. As an email enters the system, it is inserted into a message assigned with a message ID of 0 and is forwarded to the document type splitter queue 504*a*. The document then proceeds to the splitter 504 when the resource is available. The splitter 504 recognizes it as an email and forwards the message to the email queue 506*a* in preparation for processing by the email processing node 506. At the same time, the splitter 504 creates three null messages (or however many are needed to fulfill each downstream queue) and forwards the null messages to the .zip queue 508*a*, the .doc queue 510*a* and the .pdf queue 512*a*. The null messages are all given matching message IDs of 0, and annotated with a destination of branch joiner 514. The null messages allow branches which contain components requiring ordered message processing by filling the game that would result otherwise.

In instances in which the email includes attachments, the message containing the email may be annotated to indicate that there are child messages associated with the email so that the join node 514 knows when all related messages have been received. As creates new 'child' messages are generated for downstream processing, current messages are marked as "having a child" and the new child message is assigned a message ID encoded to incorporate the parent ID. Such cross-references of messages allows messages to be held at subsequent processing nodes until all its children (or its parent and sibling messages) arrive at the same node for processing.

Null messages are forwarded to the joiner queue 514 without processing where they await completion of the message from all upstream nodes. Messages requiring processing (e.g., message ID 0 at the email node 506) are processed and forwarded to the joiner queue 514*a* and released to the joiner 514 when it is available. Because the three null messages have been deleted at the joiner node 514, the aggregator node 516 does not have to process the message and it is forwarded to the index queue 518 for ingestion.

Figure 5B:
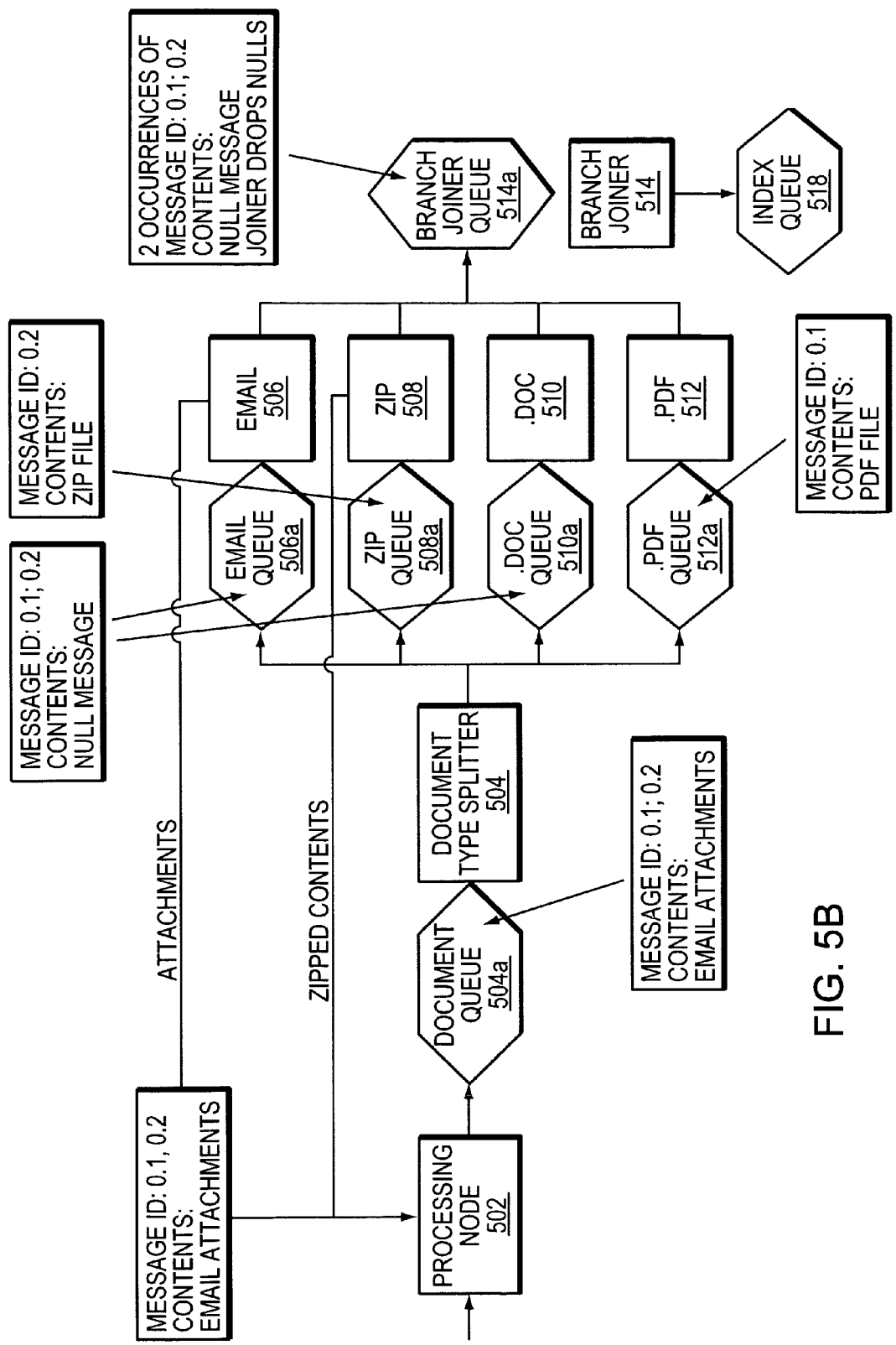
Figure 5C:
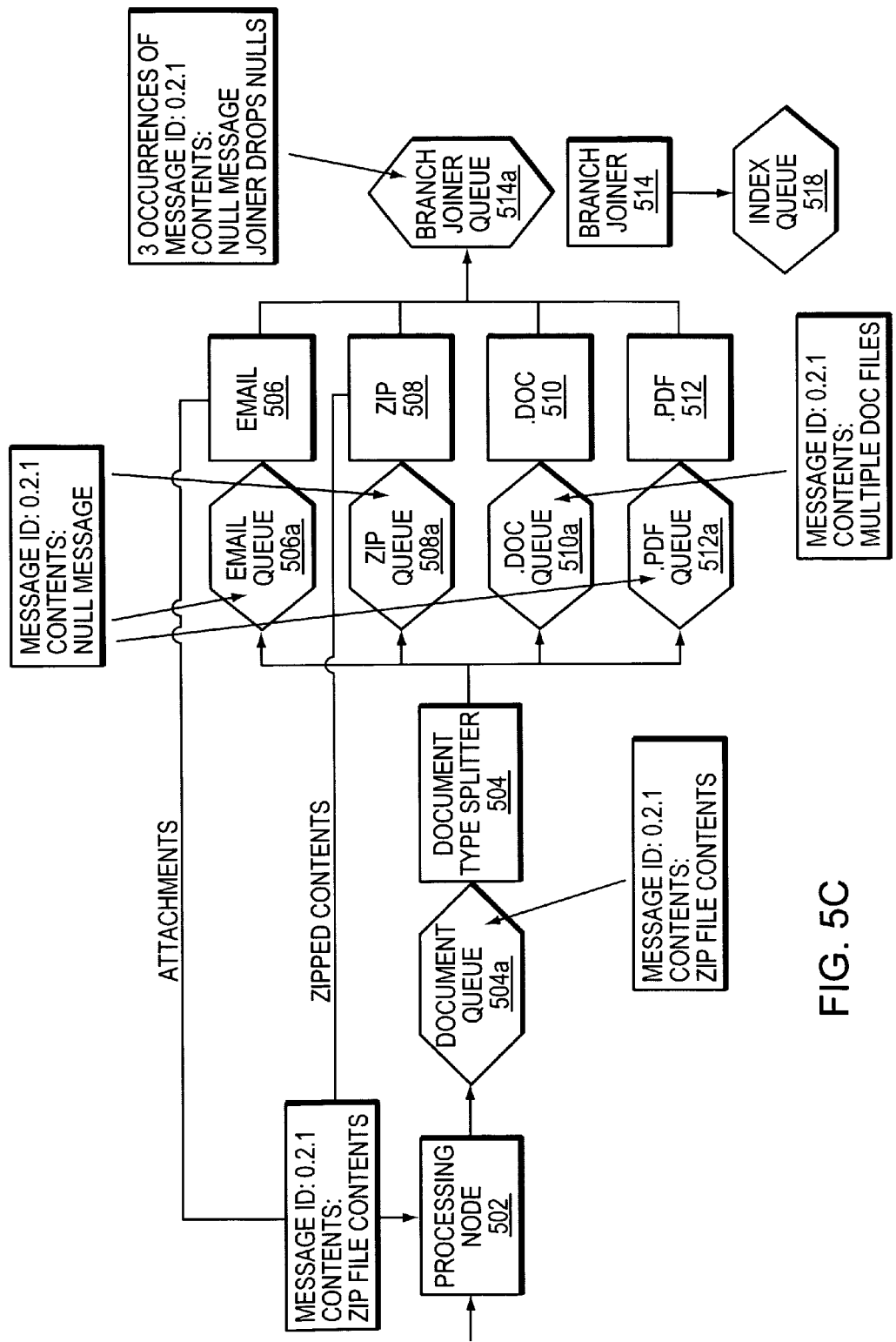
Figure 5D:
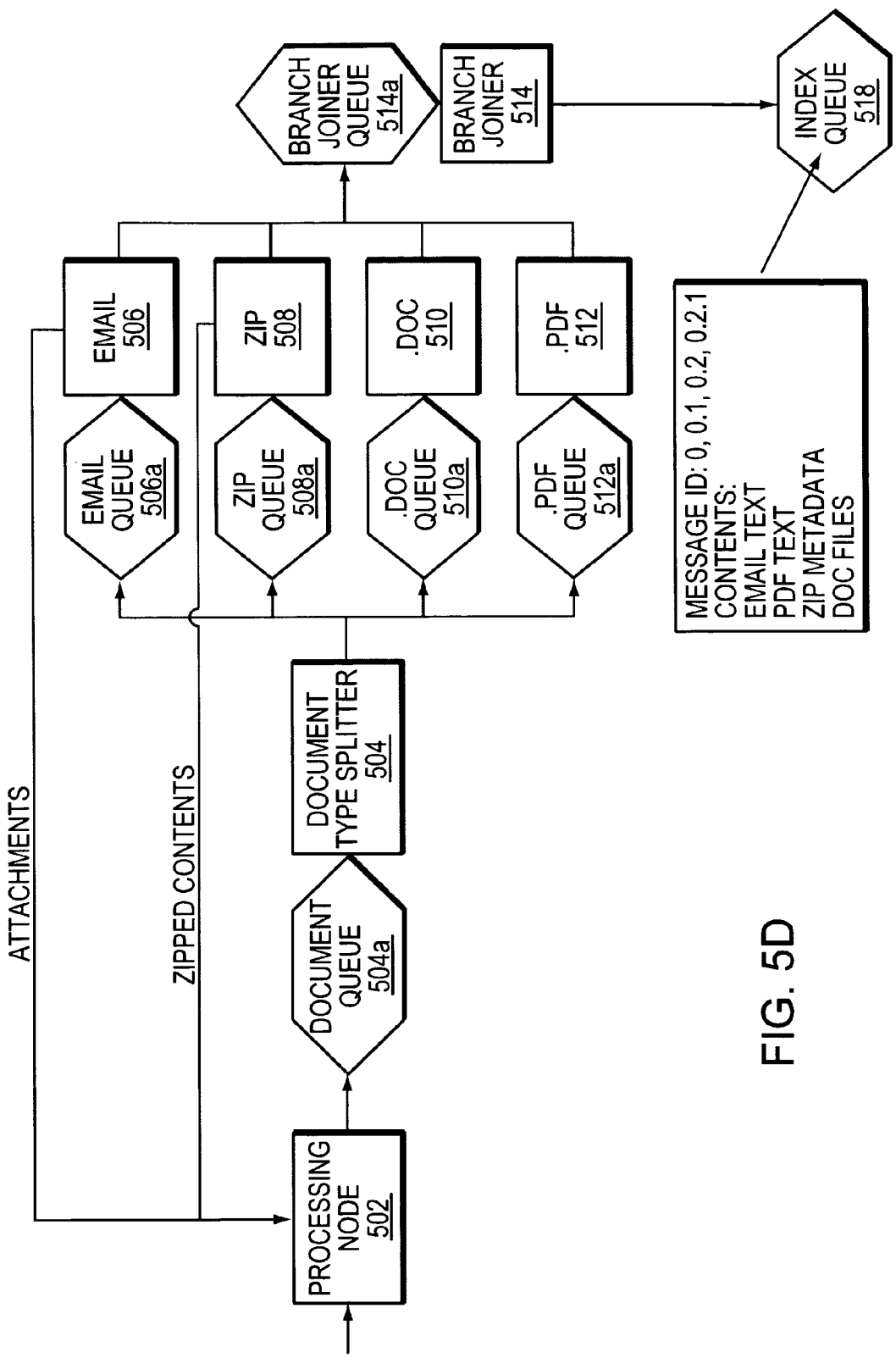

FIGS. 5B-5D illustrate a slightly more complex case in which the email message has two attachments—a .pdf file and a .zip file that includes multiple compressed .doc files. Referring specifically to FIG. 5B, after processing at the email node 506, each attachment is assigned the next multi-part message ID, re-routed back to processing node 502, and placed in the document queue 504*a*. The document splitter 504 forwards the child message including the .pdf file to the .pdf queue 512*a* and the child message including the .zip file to the .zip queue 508*a*. These two child messages are encoded with parent message ID 0 and are processed at their respective processing nodes 508 and 512. While processing the .zip file, the .zip node 508 recognizes that there are multiple files included in the .zip file and annotates the message with an indication that there are n child messages related to the message, where n represents the number of files included in the .zip file. The child messages are then forwarded to the joiner queue 514*a*. The joiner determines that all messages having the same message ID have been received (based on knowing there are two actual messages and two null messages) and deletes the null messages. However, the joiner may not process the two messages because the .zip child message includes an indication that two additional child messages (the .doc files) and awaits completion of the processing of those files.

Referring now to FIG. 5C, the .zip file contents are assigned a multi-part message IDs, rerouted back to the processing node 502, and forwarded to the document queue 504*a*. The splitter 504 forwards the two .doc files having the new multi-part message ID to the .doc queue 510*a*, and any null messages having the new multi-part message ID to each of the other processing node queues, 506*a*, 508*a* and 512*a*. All messages having the new multi-part message ID are routed to the joiner queue 514*a* and the null messaged deleted at the branch joiner 514. The joiner will await receipt of the child messages noted in the original messages having the initial multi-part message IDs (two children) and the new multi-part message ID (one child) before forwarding the messages to the index queue 518. FIG. 5D illustrates the message having a message ID of 0 and the hierarchical listing of its child messages (the .zip file and the .pdf file) and grandchild message (.doc files) being placed in the index queue 518.

The modules described throughout the specification can be implemented in whole or in part as a software program (or programs) operating on one or more processors using any suitable programming language or languages (C++, C#, java, Visual Basic, LISP, BASIC, PERL, etc.) and/or as a hardware device (e.g., ASIC, FPGA, processor, memory, storage and the like).

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof. The foregoing embodiments are therefore to be considered in all respects illustrative rather than limiting on the invention described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A system for processing messages, the system comprising:
   a first node along a first flow path through which ordered messages flow;
   the first node configured to receive a message of the ordered messages, the received message having content;
   the first node configured to remove the received message from the first flow path and divert the removed message to a second flow path for processing, the first node inserting a Null message in the first flow path in place of the removed message; and
   an ordered processing node that processes messages in order in the first flow path and that recognizes the Null message in place of the removed message.

2. The system of claim 1 further comprising an assigning node configured to assign message IDs to the messages.

3. The system of claim 1 wherein the Null message is assigned a message ID matching the removed message.

4. The system of claim 1 wherein the Null message is configured to indicate a destination node.

5. The system of claim 1 wherein the first node removes the received message in response to an unrecoverable processing error of the received message.

6. The system of claim 1 wherein the first node removes the received message in response to branching of the first flow path.

7. The system of claim 6 further comprising a joining node configured to recombines the removed message due to branching of the first flow path and delete Null messages based on the indicated destination node.

8. The system of claim 1 further comprising:
   a processing node configured to process messages and generate child messages from parent messages, and annotate parent IDs to indicate the number of child messages; and
   an assigning node configured to assign message IDs to the child messages, wherein the child message IDs are encoded to incorporate associated parent IDs.

9. The system of claim 1 further comprising an identifying node configured to identify groups of messages containing related documents.

10. The system of claim 1 further comprising:
    a plurality of successive processing nodes configured to process the received messages, including the first node and the ordered processing node;
    and the first node further configured to allow output of messages out of order but limiting output of such messages to be within a delta of other messages.

11. The system of claim 10 wherein limiting output of messages includes pausing processing of messages outside the delta of other messages as defined by message IDs.

12. The system of claim 10 wherein each processing node is configured to process messages using asynchronous data transmission and further configured to recognize and process the Null messages.

13. A method for processing messages, the method comprising, in an electronic processing system:

in a first node along a first flow path through which ordered messages flow, receiving a message of the ordered messages, the message having content;

in the first node, removing the received message of ordered messages from the first flow path and inserting a Null message for the removed message;

diverting the removed message to a second flow path for processing; and in an ordered processing node, processing messages in order and recognizing the Null message in the first flow path in place of the removed message.

14. The method of claim 13 further comprising assigning message IDs to the messages.

15. The method of claim 14 wherein the Null message is assigned a message ID matching the removed message.

16. The method of claim 13 wherein the Null message is configured to indicate a destination node.

17. The method of claim 13 wherein removing the received message includes removing the received message in response to an unrecoverable processing error of the received message.

18. The method of claim 13 wherein removing the received message includes removing the received message in response to branching of the first flow path.

19. The method of claim 18 further comprising recombining messages due to branching of the first flow path and deleting Null messages based on the indicated destination node.

20. The method of claim 14 further comprising:

processing messages and generating child messages from parent messages, and annotating parent IDs to indicate the number of child messages; and assigning message IDs to the child messages, wherein the child message IDs are encoded to incorporate associated parent IDs.

21. The method of claim 13 further comprising identifying groups of messages containing related documents.

22. The method of claim 13 further comprising:

processing the messages, allowing for output of messages out of order; and limiting output of such messages to be within a delta of other messages.

23. The method of claim 22 wherein limiting output of messages includes pausing processing of messages outside the delta of other messages as defined by message IDs.

24. The method of claim 22 further comprising processing messages using asynchronous data transmission and recognizing and processing the Null messages.

25. An article of manufacture having computer-readable program portions embedded thereon for processing messages, the program portions comprising instructions for:

in a first node along a first flow path through which ordered messages flow, receiving a message of the ordered messages, the received message having content;

the first node configured to remove the received message from the first flow path and inserting a Null message for the removed message, where the removed message is diverted to a second flow path for processing; and in an ordered processing node, processing messages in order and recognizing the Null message in the first flow path in place of the removed message.

26. The article of manufacture of claim 25 further comprising assigning message IDs to the messages.

27. The article of manufacture of claim 26 wherein the Null message is assigned a message ID matching the removed message.

28. The article of manufacture of claim 25 wherein the Null message is configured to indicate a destination node.

29. The article of manufacture of claim 25 wherein removing the received message includes removing the received message in response to an unrecoverable processing error of the received message.

30. The article of manufacture of claim 25 wherein removing the received message includes removing the received message in response to branching of the flow path.

31. The article of manufacture of claim 30 further comprising recombining messages due to branching of the flow path and deleting Null messages based on the indicated destination node.

32. The article of manufacture of claim 26 further comprising:

processing messages and generating child messages from parent messages, and annotating parent IDs to indicate the number of child messages; and assigning message IDs to the child messages, wherein the child message IDs are encoded to incorporate associated parent IDs.

33. The article of manufacture of claim 25 further comprising identifying groups of messages containing related documents.

34. The article of manufacture of claim 25 further comprising:

processing the messages, allowing for output of messages out of order; and limiting output of such messages to be within a delta of other messages.

35. The article of manufacture of claim 34 wherein limiting output of messages includes pausing processing of messages outside the delta of other messages as defined by message IDs.

36. The article of manufacture of claim 34 further comprising processing messages using asynchronous data transmission and recognizing and processing the Null messages.

37. The system of claim 1 wherein the second flow path is configured to allow recursive processing of the removed message.

38. The method of claim 13 wherein the second flow path is configured to allow recursive processing of the removed message.

39. A system for processing messages, the system comprising:

a first node along a first flow path through which ordered messages flow;

the first node configured to receive a message of the ordered messages, the received message having content;

the first node configured to remove the received message from the first flow path to diver the removed message to a second flow path for processing;

the first node configured to insert, in place of the removed message, in the first flow path a Null message that is assigned a message ID matching the removed message; and an ordered processing node that processes messages in order in the first flow path and that recognizes the Null message in place of the removed message.

* * * * *